(12) United States Patent
Lamendola et al.

(10) Patent No.: US 8,427,363 B1
(45) Date of Patent: Apr. 23, 2013

(54) DETERMINING WHETHER A TRACK IS A LIVE TRACK OR A VIRTUAL TRACK

(75) Inventors: Joel E. Lamendola, S Burlington, VT (US); Maxim Raykin, Waban, MA (US); Stanley J. Poreda, Bristol, RI (US)

(73) Assignee: Raytheon Company, Waltham, MA (US)

( * ) Notice: Subject to any disclaimer, the term of this patent is extended or adjusted under 35 U.S.C. 154(b) by 647 days.

(21) Appl. No.: 12/547,764

(22) Filed: Aug. 26, 2009

(51) Int. Cl.
*G09B 9/54* (2006.01)
*G01S 7/02* (2006.01)
*G01S 13/00* (2006.01)
*G09B 9/00* (2006.01)
*G01S 7/00* (2006.01)

(52) U.S. Cl.
USPC .......... 342/91; 342/89; 342/94; 342/95; 342/175; 342/195; 434/1; 434/2

(58) Field of Classification Search .......... 434/1–5; 342/82–103, 118, 159, 165–175, 195
See application file for complete search history.

(56) References Cited

U.S. PATENT DOCUMENTS

| | | | | |
|---|---|---|---|---|
| 5,133,663 A * | 7/1992 | Willingham et al. | | 434/2 |
| 5,134,412 A | 7/1992 | Baseghi et al. | | |
| 5,421,728 A * | 6/1995 | Milden | | 434/5 |
| 5,431,568 A * | 7/1995 | Fey et al. | | 434/2 |
| 5,892,479 A * | 4/1999 | Mills et al. | | 342/172 |
| 6,067,041 A * | 5/2000 | Kaiser et al. | | 342/171 |
| 6,075,480 A * | 6/2000 | Deliberis, Jr. | | 342/169 |
| 6,639,547 B2 * | 10/2003 | Solbach | | 342/165 |
| 6,927,725 B2 * | 8/2005 | Wittenberg et al. | | 342/174 |
| 7,038,616 B2 * | 5/2006 | Pillai | | 342/165 |
| 7,132,977 B1 * | 11/2006 | Pillai | | 342/159 |
| 7,612,710 B2 * | 11/2009 | Lamendola et al. | | 342/195 |
| 7,852,260 B2 * | 12/2010 | Sarafian | | 342/169 |
| 2004/0227661 A1 | 11/2004 | Godsy | | |
| 2006/0039531 A1 | 2/2006 | Neelakantan | | |
| 2009/0046004 A1 * | 2/2009 | Lamendola et al. | | 342/195 |

OTHER PUBLICATIONS

Notification of Transmittal of the International Search Report and the Written Opinion of the International Searching Authority, or the Declaration, PCT/US2008/071406 dated Nov. 24, 2008.
Dynetics, The Power of Solutions, InFocus Newsletter, vol. 16, Issue 3, Aug. 2006, 4 pages.

(Continued)

*Primary Examiner* — Bernarr Gregory
(74) *Attorney, Agent, or Firm* — Daly, Crowley, Mofford & Durkee LLP

(57) ABSTRACT

In one aspect, a method includes tagging a track as a live track if a tagging statistic is greater than a tagging statistic threshold and tagging the track as a virtual track if the tagging statistic is less than the tagging statistic threshold. In another aspect, an article includes a machine-readable medium that stores executable instructions to determine whether a track is a live track or a virtual track. The instructions causing a machine to tag a track as a live track if a tagging statistic is greater than a tagging statistic threshold and tag the track as a virtual track if the tagging statistic is less than the tagging statistic threshold. In a further aspect, an apparatus includes circuitry to tag a track as a live track if a tagging statistic is greater than a tagging statistic threshold and tag the track as a virtual track if the tagging statistic is less than the tagging statistic threshold.

20 Claims, 8 Drawing Sheets

OTHER PUBLICATIONS

U.S. Appl. No. 11/872,781, filed Oct. 16, 2007.
U.S. Appl. No. 60/956,219, Joel E. Lamendola, et al., filed Aug. 16, 2007, 58 pages.
PCT Patent Application No. PCT/US2008/071406, Joel E. Lamendola, et al., filed on Jul. 29, 2008, 36 pages.

International Preliminary Report on Patentability (Form PCT/IB/373) and Written Opinion of the International Searching Authority (Form PCT/IB/237) for PCT/US2008/071406, dated Feb. 16, 2010, 5 pages.

* cited by examiner

DETERMINING WHETHER A TRACK IS A LIVE TRACK OR A VIRTUAL TRACK

GOVERNMENT SPONSORED RESEARCH

This invention was made with Government support under Contract Number H00006-03-C-0047 awarded by the Department of Defense, Missile Defense Agency. The United States Government has certain rights in the invention.

BACKGROUND

Radar processing systems process live tracks in a so called live mode or live environment. Some radar processing systems include other modes that instead of tracking live tracks in the live mode, the radar processing system tracks simulated or virtual tracks in a virtual mode or virtual environment. In a virtual mode, a radar processing system may be used to train personnel. Generally, the radar processing system is in either mode but typically not at the same time.

SUMMARY

In one aspect, a method includes tagging a track as a live track if a tagging statistic, $\beta$, is greater than a tagging statistic threshold, M and tagging the track as a virtual track if the tagging statistic, $\beta$, is less than the tagging statistic threshold, M.

In another aspect, an article includes a machine-readable medium that stores executable instructions to determine whether a track is a live track or a virtual track. The instructions causing a machine to tag a track as a live track if a tagging statistic, $\beta$, is greater than a tagging statistic threshold, M and tag the track as a virtual track if the tagging statistic, $\beta$, is less than the tagging statistic threshold, M.

In a further aspect, an apparatus includes circuitry to tag a track as a live track if a tagging statistic, $\beta$, is greater than a tagging statistic threshold, M and tag the track as a virtual track if the tagging statistic, $\beta$, is less than the tagging statistic threshold, M.

DETAILED DESCRIPTION

Described herein is an approach to track live and virtual tracks (also called targets or objects) simultaneously to form a virtual-over-live environment. The approach includes identifying whether a track is a live track or a virtual track and providing a probability that the track has been correctly identified as a live track or a virtual track. For example, the approach described herein allows training scenarios to be implemented using simulated or virtual data while still receiving live data. Thus, users may be able to maintain operational readiness while performing training exercises. In a virtual-over-live environment, a radar processing system, (e.g., a radar processing system 10 (FIG. 1)) identifies tracks as being a virtual track or a live track so that the radar processing system safely operates in an environment with concurrent live and virtual tracks.

Figure 1:
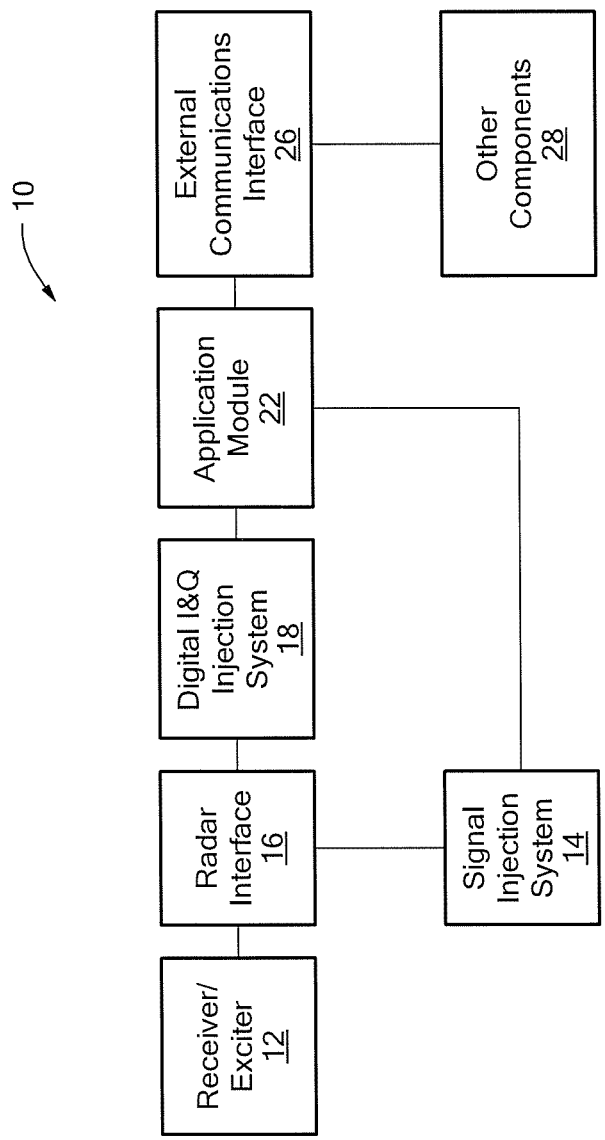
FIG. 1 is a block diagram of a radar system including a digital signal injection system to process live and virtual radar tracks.

Referring to FIG. 1, in one example, a radar processing system 10 includes a receiver/exciter (REX) 12, a digital in-phase and quadrature (I&Q) signal injection system (SIS) 14, a radar interface 16, a signal processing system (SPS) 18, an application module 22, an external communications interface 26 and other component 28.

The REX 12 receives reflected signals from a target via an antenna (not shown). The reflected signals include live data. The digital I&Q SIS 14 generates or injects virtual data into the radar processing system 10. In one example, the digital I&Q SIS 14 is a Radar Digital Signal Injection System (RD-SIS) developed for the United States Government by the assignee of this patent application.

The radar interface 16 merges the live and virtual data and provides the merged live and virtual data to the SPS 18. The SPS 18 performs analog-to-digital conversion and detection processing. The SPS 18 analyzes the signals received and passes the resulting detection information to the application module 22. The application module 22 associates tracks with detections and forms instructions for outgoing signals.

In one example, the other components 28 may include a computer from which a user monitors radar data. In another example, the other components 28 may be connected to a network of other computers or hardware/software items or a centralized or decentralized processing center.

From the subsequent signal received, the REX 12 generates digital I&Q that is passed to the SPS 18 following the analog-to-digital conversion, thus completing the cycle. Throughout processing, the external communications interface 26 translates tactical information received from the application module 22 and formats and transmits the tactical information for use by other components 28. For example, other components 28 may include a command and control battle management communications (C2BMC) which is connected to a Ballistic Missile Defense System (BMDS) (not shown). Thus, live and virtual tracks exist simultaneously within the radar processing system 10 and a need exists to identify which track is a live track and which track is a virtual track to ensure safe and effective system operation.

Figure 2:
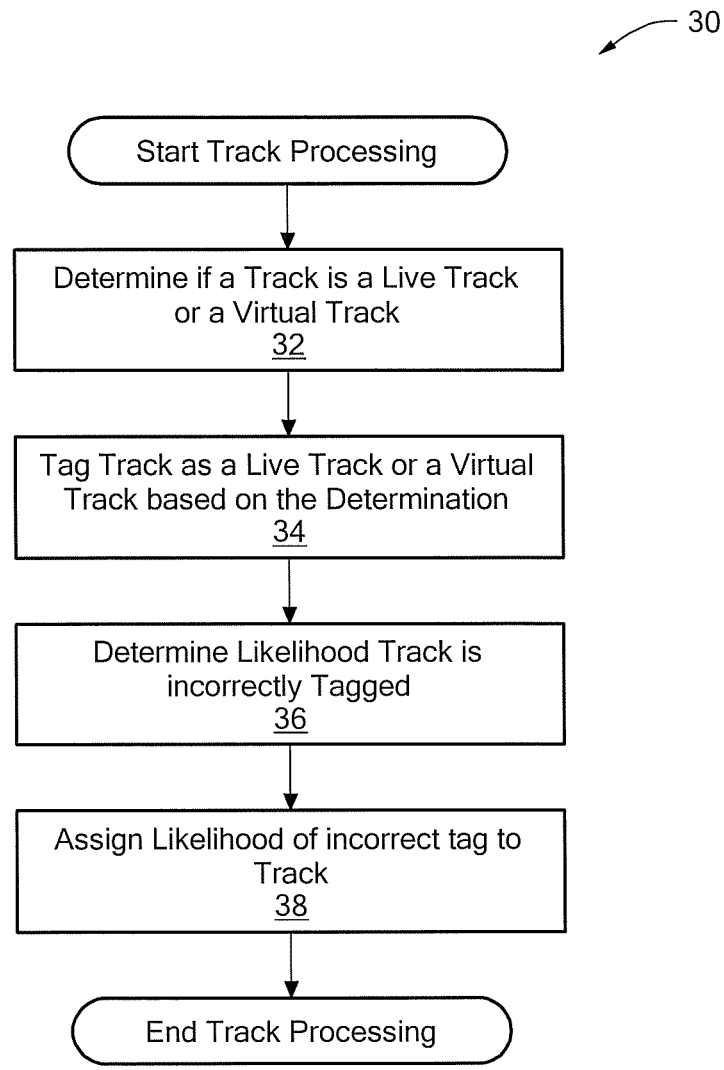
FIG. 2 is a flowchart of a process used to process a track.

Referring to FIG. 2, a process of track processing is a process 30. A track is determined to be a live track or a virtual track (32). The track is tagged as being a live track or a virtual track based on the determination in processing block 32 (34). A likelihood that the track has been incorrectly tagged is determined (36) and assigned to the track (38).

As will be described further, track correlation tagging using a tagging statistic method is an approach that addresses the problem of identifying tracks as either a virtual track or a live track based on the relationship of track states to known virtual trajectory states (i.e., "Truth" data) that have been used to generate virtual track object injections into the radar system 10. The approach described herein also assigns a confidence level with the associated track identification.

A track tagging process is performed by comparing track states, track state uncertainties (e.g., track error covariance), and a priori virtual track trajectory information in order to tag a track as a virtual track or a live track based on its calculated uncertainty region and its relationship to a virtual track trajectory. That is, tracks whose uncertainty region includes a known virtual trajectory are tagged as a virtual track, and tracks whose uncertainty region does not include a known virtual trajectory are tagged as a live track.

The tagging statistic tagging method is a process that determines a metric referred to as a tagging statistic, $\beta$, which is determined from known track information and known truth information. The value of the Tagging Statistic, $\beta$, is then compared to expected values based on its probability distribution with respect to known virtual object trajectories (and live object trajectories, if available) and a virtual tag or a live tag assessment is made. This process offers a critical complementary safety feature beyond solely identifying a track as a live track or a virtual track. The tagging statistic tagging method also provides a probability that each object has been correctly identified as either a live track or a virtual track.

In particular, a track's Tagging Statistic, $\beta$, is given by:

$$\beta(X, P, X_V) = (X - X_V)^T P^{-1} (X - X_V), \quad \text{(Eq. 1)}$$

where $X_V$ is a state vector of a virtual object (truth) at the time of the last track update, X is a state vector of the track and P is the covariance matrix for the state vector of the track state vector and $(X - X_V)^T$ is a transpose of the $(X - X_V)$.

A closeness metric of a track, D, is a metric of a live object's closeness to true virtual trajectories. D represents a normalized distance between expected live and virtual objects. The closeness metric, D of an object is given by:

$$D(X_R, P, X_V) = (X_R - X_V)^T P^{-1} (X_R - X_V) \quad \text{(Eq. 2)}$$

where $X_R$ is a true state vector on which the calculated track state vector, X, is based.

A Tagging Statistic (TS) Threshold, M, is selected based on a desired likelihood, $\epsilon$, that a virtual object is incorrectly identified as a live track. The TS threshold, M, and $\epsilon$ are governed by a probability density function of $\beta$ calculated for a virtual object for k degrees of freedom (DOF). k usually refers to x, y and z coordinates and corresponding velocities, so that k equals 6. The probability density function of $\beta$ calculated for a virtual object is given by:

$$p_\beta^{Virtual}(z) = \frac{1}{2^{\frac{k}{2}} \Gamma\left(\frac{k}{2}\right)} e^{-\left(\frac{z}{2}\right)} z^{\left(\frac{k}{2} - 1\right)} \text{ for } z > 0, \quad \text{(Eq. 3)}$$

and $$p_\beta^{Virtual}(z) = 0 \text{ otherwise,}$$

where $$\Gamma\left(\frac{k}{2}\right)$$

is a Gamma function.

A cumulative density function of equation 3 that determines $\epsilon$ is given by:

$$\varepsilon = 1 - \int_{-\infty}^{M} p_\beta^{Virtual}(z) dz \quad \text{(Eq. 4)}$$

After M and $\epsilon$ have been defined, a likelihood, $\rho$, that a live object is incorrectly identified as a virtual track can be determined based, in part, on the metric, D. Specifically, $\rho$ is governed by a probability density function of $\beta$ calculated for a live object that depends on z, k, and the metric D. The probability density function of $\beta$ calculated for a live object is given by:

$$p_\beta^{Live}(z \mid D) = \frac{1}{2} \left(\frac{z}{D}\right)^{\left(\frac{k-2}{4}\right)} e^{-\left(\frac{z+D}{2}\right)} I_{\frac{k}{2}-1}\left(\sqrt{zD}\right) \text{ for } z > 0, \quad \text{(Eq. 5)}$$

and $$p_\beta^{Live}(z \mid D) = 0 \text{ otherwise,}$$

where $$I_{\frac{k}{2}-1}$$

is a modified Bessel function.

The cumulative density function of Equation 5 that determines $\rho$ is given by $$\rho = \int_{-\infty}^{M} p_\beta^{Live}(z \mid D) dz \quad \text{(Eq. 6)}$$

Thus, if the tagging statistic, $\beta$ for a given track is greater than the TS threshold, M the track is identified as a live track with a likelihood of an incorrect tag, $\epsilon$. If the tagging statistic, $\beta$, for a given track is less than the TS threshold, M the track is identified as a virtual track with a likelihood of incorrect tag of $\rho$.

Figure 3:
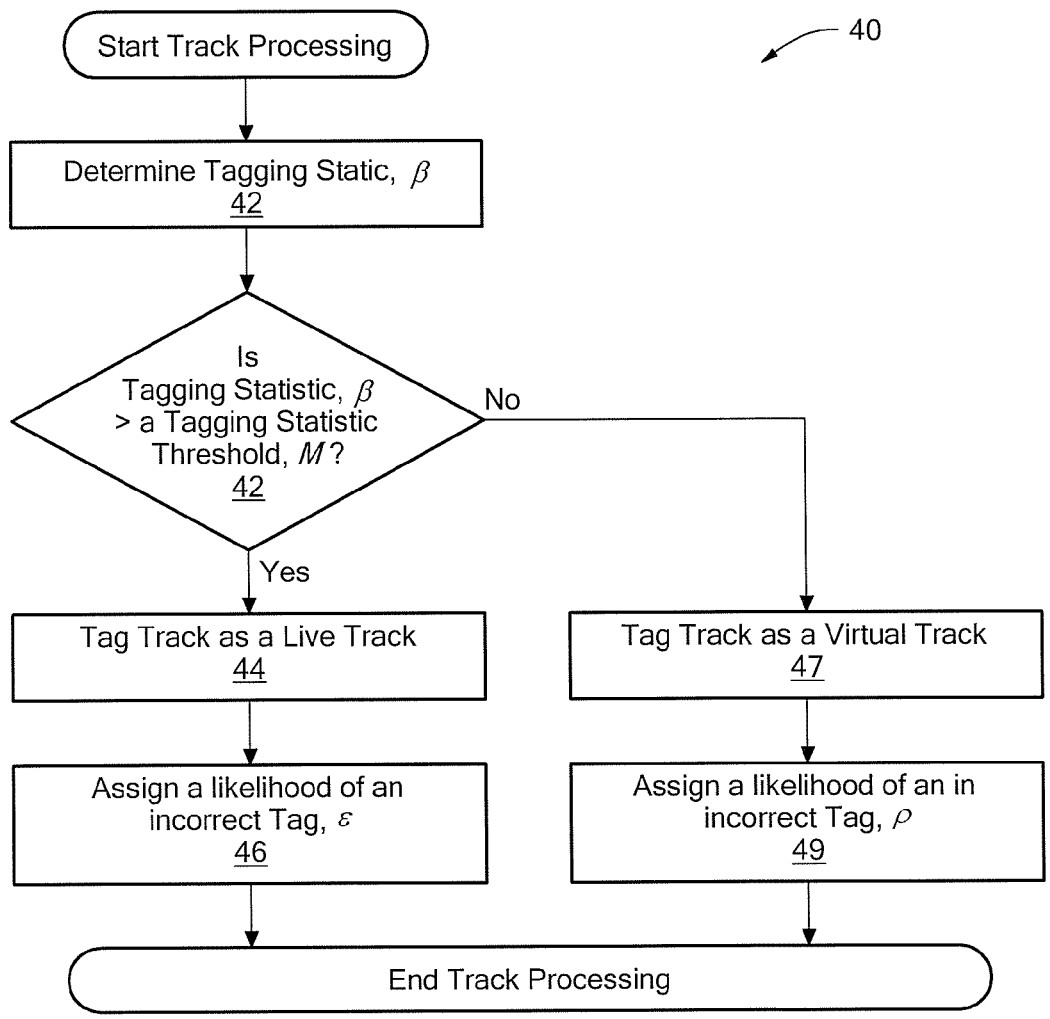
FIG. 3 is a flowchart of an example of the process in FIG. 2.

Referring to FIG. 3, an example of a process to process a track is a process 40. The tagging statistic, $\beta$, is determined (42). For example, Equation 1 is used with X, P and $X_V$, which are known. It is determined whether the tagging statistic $\beta$, is less than to the tagging statistic threshold (42).

If the tagging statistic, $\beta$, is less than to the tagging statistic threshold, M, the track is tagged as a live track (44). A likelihood of an incorrect tag is assigned $\epsilon$ (46).

If the tagging statistic, $\beta$, is not less than to the tagging statistic threshold, M, the track is tagged as a virtual track (47). A likelihood of an incorrect tag is assigned $\rho$ (49).

Figure 4:
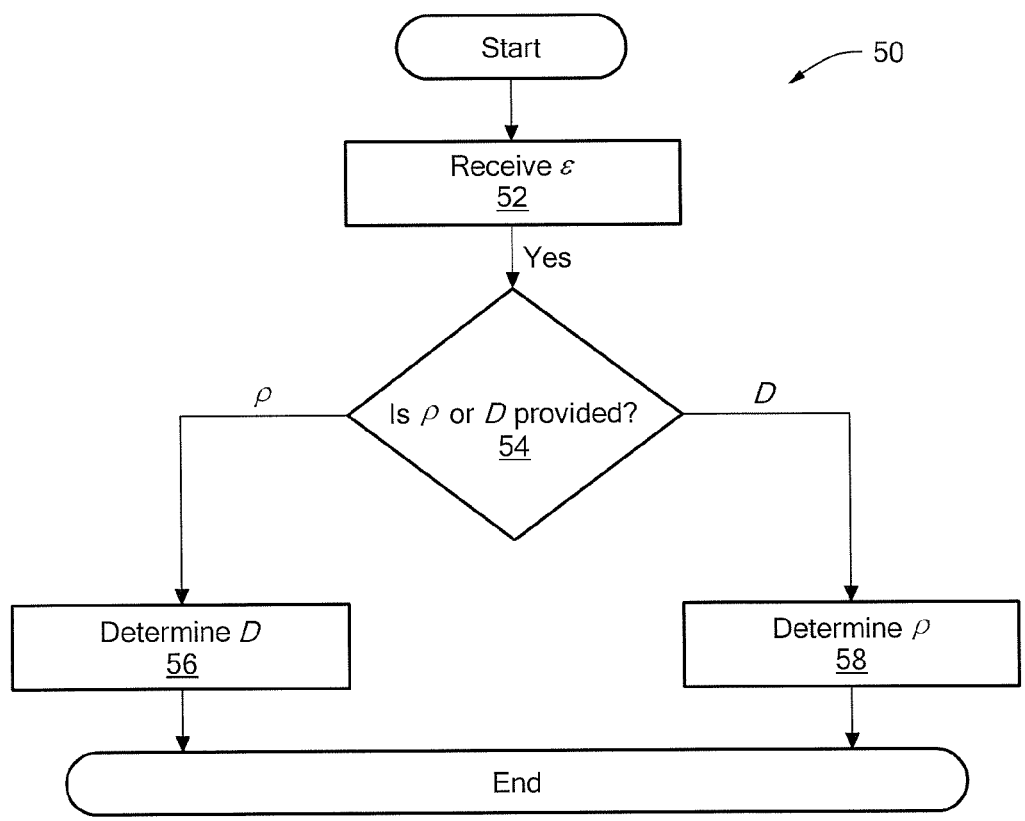
FIG. 4 is a flowchart of an example of a process used by a user to process the track.
Figure 8:
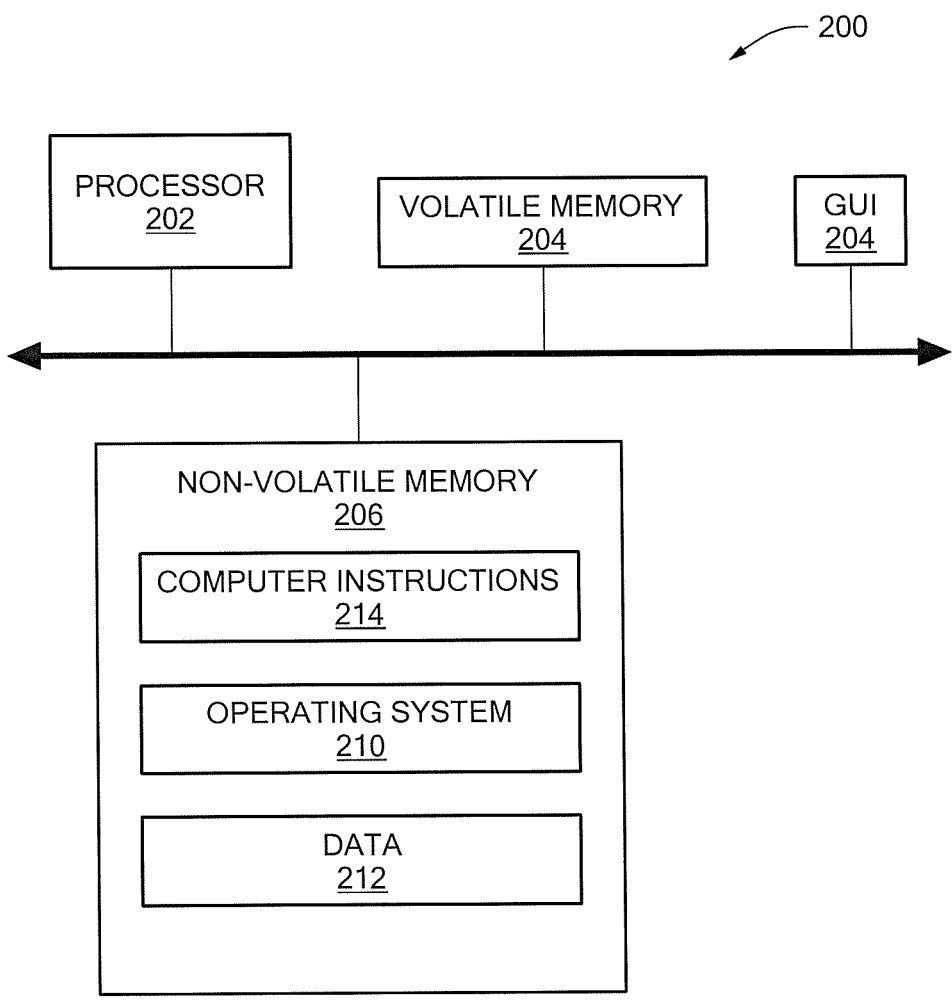
FIG. 8 is a block diagram of a computer used to execute one or more of the processes in FIGS. 2 to 4.

Referring to FIG. 4, in one example, if given $\epsilon$, the likelihood that a live object has been incorrectly tagged as a virtual track and given one of the variables $\rho$ or D, then the other of the variables $\rho$ or D may be determined using Equations 1 to 6. For example, once $\epsilon$ is known then M is known using Equations 3 and 4. Thus, using Equations 5 and 6 the remaining unknown variables are D and $\rho$ so that given one of them one may solve for the remaining variable. One example of a process to determine $\rho$ or D is a process 50. The variable $\epsilon$ is received (52). For example, a user provides the variable, for example, using a graphical user interface 204 (FIG. 8). It is determined whether D or $\rho$ is also provided (54). For example, a user selects a variable, D or $\rho$, to provide using the GUI 202 (FIG. 8). If $\rho$ is provided then D is determined (56). If D is provided then $\rho$ is determined (58).

Figure 5:
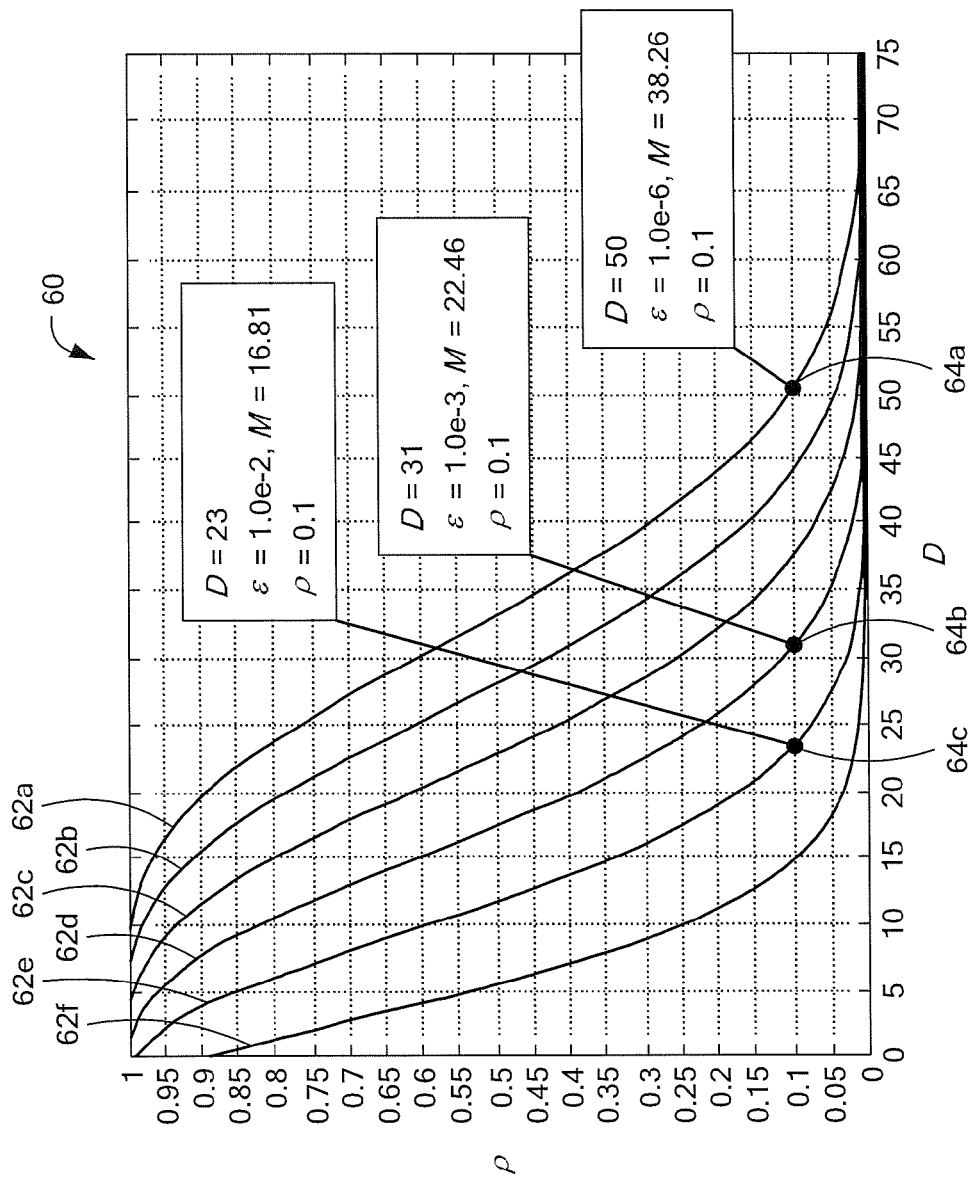
FIG. 5 is a graph of a likelihood that a track tagged as a virtual tag incorrectly tagged, $\rho$ versus a distance, D, between live and virtual objects.

Referring to FIG. 5, a graph 60 of $\rho$ versus D includes curves 62a-62f for various different $\epsilon = 10^{-n}$ for n=1, 2, ... k (k=6). For example, a first curve 62a represents $\epsilon = 10^{-1}$, a second curve 62b represents $\epsilon = 10^{-2}$, a third curve 62c represents $\epsilon = 10^{-3}$, a fourth curve 62d represents $\epsilon = 10^{-4}$, a fifth curve 62e represents $\epsilon = 10^{-5}$ and a sixth curve 62f represents $\epsilon = 10^{-6}$. A first point 64a corresponds to D=50, $\epsilon = 10^{-5}$, M=38.26 and ρ=0.1; a second point 64b corresponds to D=31, ϵ=10⁻³, M=22.46 and ρ=0.1; and a third point 64c corresponds to D=23, ϵ=10⁻², M=16.81 and ρ=0.1.

Figure 6:
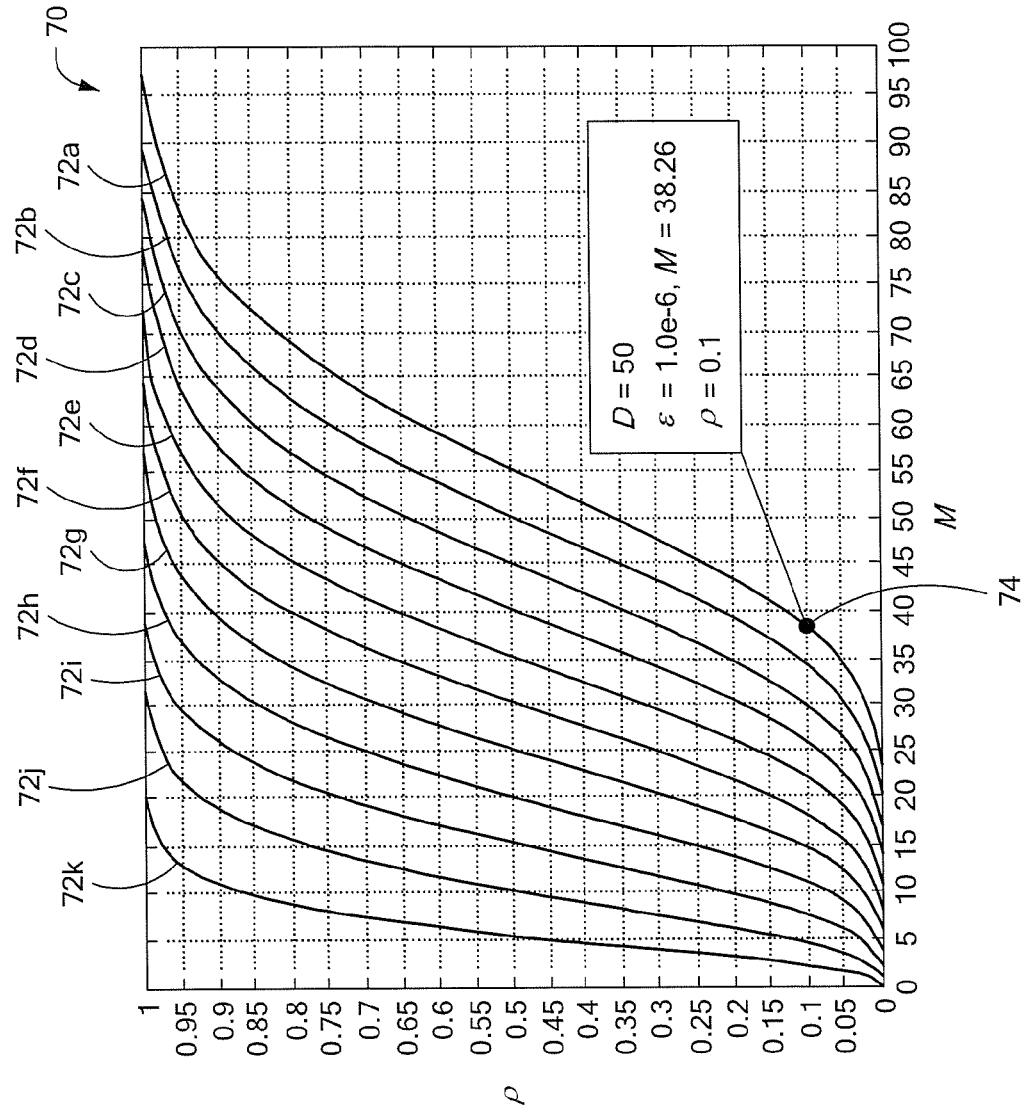
FIG. 6 is a graph of $\rho$ versus a tagging statistic threshold, M.

Referring to FIG. 6, a graph 70 of ρ versus M includes curves 72a-72k for various different D=0. 5. 10. 15. ... 50 (k=6). For example, a first curve 72a represents D=0, a second curve 72b represents D=5, a third curve 72c represents D=10, a fourth curve 72d represents D=15, a fifth curve 72e represents D=20 and a sixth curve 72f represents D=25, a seventh curve 72g represents D=30, an eighth curve 72h represents D=35, a ninth curve 72i represents D=40, a tenth curve 72j represents D=45 and an eleventh curve 72k represents D=50. A point 74 corresponds to D=50, ϵ=10⁻⁵, M=38.26 and ρ=0.1.

Figure 7:
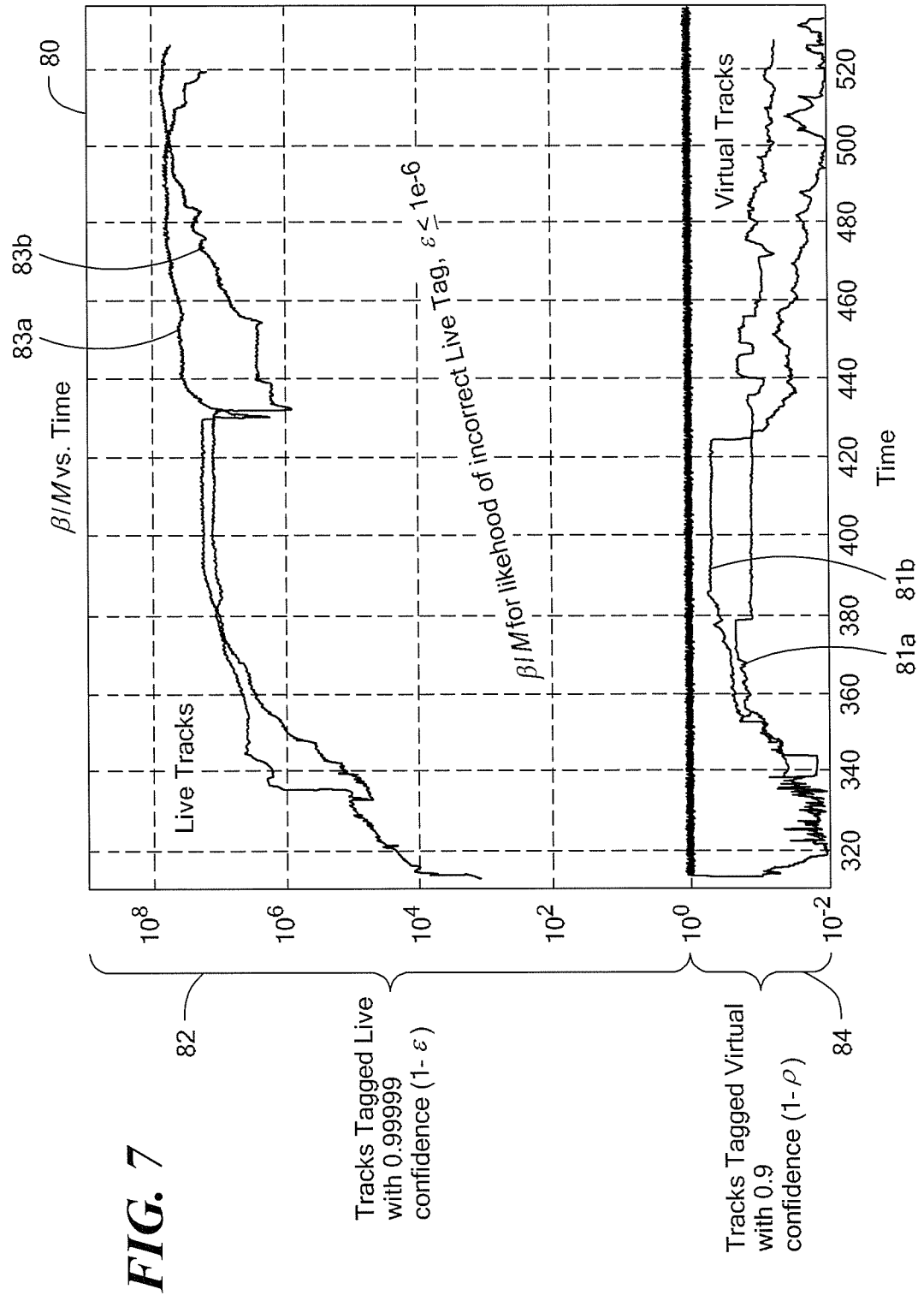
FIG. 7 is a graph of a tagging statistic, $\beta$, divided by M versus time.

Referring to FIG. 7, a graph 80 of confidence reflects an example of four objects (two virtual objects and two live objects) launched in close proximity then separate from a single radar beam during their flight. In this example, k=6 for a six-state tracker, ϵ is selected to be 10⁻⁶, therefore M=38.26, a minimum D=50 is chosen, therefore ρ=0.1. A first portion 82 of the graph 80 shows plots 83a, 83b for the two tracks track tagged as live tracks with a 0.99999 confidence (1-ϵ) and a second portion 84 of the graph 80 shows plots 81a, 81b for the two tracks track tagged as virtual tracks with a 0.9 confidence (1-ρ).

Referring to FIG. 8, a computer such as a computer 200 may be used to execute one or more of the processes 30, 40 and 50. The computer 200 includes a processor 202, a volatile memory 204, a non-volatile memory 206 (e.g., hard disk) and a graphical user interface (GUI) 208 (such as a keyboard, a mouse, a monitor or a touch screen or any combination thereof). Non-volatile memory 206 includes an operating system 210, data 212 (e.g., live and virtual data, Equations 1 to 6, known and determined terms used in Equations 1 to 6 and so forth) and computer instructions 214 which are executed out of volatile memory 204 to perform the respective processes (e.g., the processes 30, 40 and 50). The computer may be located at the application module 22, the external communications interface 26, the other components 28 or any other location that receives k-state filter tracking data.

The processes described herein are not limited to the specific embodiments described herein. For example, the processes are not limited to the specific processing order of FIGS. 2 to 4. Rather, any of the blocks of FIGS. 2 to 4 may be re-ordered, combined or removed, performed in parallel or in serial, as necessary, to achieve the results set forth above.

Processes 30, 40 and 50 are not limited to use with the hardware and software of FIG. 8; rather they may find applicability in any computing or processing environment and with any type of machine or set of machines that is capable of running a computer program. Processes 30, 40 and 50 may be implemented in hardware, software, or a combination of the two. Processes 30, 40 and 50 may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform processes 30, 40 and 50 and to generate output information.

The system may be implemented, at least in part, via a computer program product, for execution by, or to control the operation of, data processing apparatus (e.g., a programmable processor, a computer, or multiple computers)). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer to perform processes 30, 40 and 50.

The system described herein is not limited to use with the hardware and software described above. The system may be implemented in digital electronic circuitry, or in computer hardware, firmware, software, or in combinations thereof.

Elements of different embodiments described herein may be combined to form other embodiments not specifically set forth above.

What is claimed is:

1. A method comprising:
    tagging a track as a live track, in a radar processing system using a computer, if a tagging statistic is greater than a tagging statistic threshold; and
    tagging the track as a virtual track, in the radar processing system using the computer, if the tagging statistic is less than the tagging statistic threshold.

2. The method of claim 1, further comprising assigning a likelihood that the track has been correctly tagged.

3. The method of claim 1 wherein the tagging statistic is given by:

$$\beta(X,P,X_V)=(X-X_V)^T P^{-1}(X-X_V),$$

where $X_V$ is a state vector of a virtual object at the time of the last track update, X is a state vector of the track and P is the covariance matrix for the state vector of the track.

4. The method of claim 1, further comprising assigning a likelihood ρ that a live object is incorrectly identified as a virtual track,
    wherein $$\rho = \int_{-\infty}^{M} p_\beta^{Live}(z \mid D)\,dz$$

and where $p_\beta^{Live}$ is a probability density function of the tagging statistic for a live object, M is the tagging statistic threshold and D represents a normalized distance between expected live and virtual objects.

5. The method of claim 4 wherein D is represented by:

$$D(X_R,P,X_V)=(X_R-X_V)^T P^{-1}(X_R-X_V)$$

where $X_R$ is a true state vector on which the calculated track state vector, X, is based.

6. The method of claim 4 wherein $$p_\beta^{Live}(z \mid D) = \frac{1}{2}\left(\frac{z}{D}\right)^{\left(\frac{k-2}{4}\right)} e^{-\left(\frac{z+D}{2}\right)} I_{\frac{k}{2}-1}\left(\sqrt{zD}\right) \text{ for } z > 0,$$

and $p_\beta^{Live}(z|D)=0$ otherwise, where $$I_{\frac{k}{2}-1}$$

is a modified Bessel function.

7. The method of claim 4, further comprising assigning a likelihood ϵ that a virtual object is incorrectly identified as a live track,
wherein $$\varepsilon = 1 - \int_{-\infty}^{M} p_\beta^{Virtual}(z)dz$$

and where $p_\beta^{Virtual}$ is a probability density function of the tagging statistic for a virtual object and M is the tagging statistic threshold.

8. The method of claim 7 wherein $$p_\beta^{Virtual}(z) = \frac{1}{2^{\frac{k}{2}}\Gamma\left(\frac{k}{2}\right)} e^{-\left(\frac{z}{2}\right)} z^{\left(\frac{k}{2}-1\right)} \text{ for } z > 0,$$

and $p_\beta^{Virtual}(z) = 0$ otherwise.

9. An article comprising:
a non-transitory computer-readable medium that stores executable instructions to determine whether a track is a live track or a virtual track, the instructions causing a machine to:
tag a track as a live track if a tagging statistic is greater than a tagging statistic threshold and
tag the track as a virtual track if the tagging statistic is less than the tagging statistic threshold.

10. The article of claim 9 wherein the tagging statistic is given by:

$$\beta(X,P,X_V) = (X-X_V)^T P^{-1}(X-X_V),$$

where $X_V$ is a state vector of a virtual object at the time of the last track update, X is a state vector of the track and P is the covariance matrix for the state vector of the track.

11. The article of claim 10, further comprising instructions to assign a likelihood ρ that a live object is incorrectly identified as a virtual track,
wherein $$\rho = \int_{-\infty}^{M} p_\beta^{Live}(z \mid D)dz$$

and where $p_\beta^{Live}$ is a probability density function of the tagging statistic for a live object, M is the tagging statistic threshold and D represents a normalized distance between expected live and virtual objects.

12. The article of claim 11 wherein D is represented by:

$$D(X_R,P,X_V) = (X_R-X_V)^T P^{-1}(X_R-X_V)$$

where $X_R$ is a true state vector on which the calculated track state vector, X, is based.

13. The article of claim 11 wherein $$p_\beta^{Live}(z \mid D) = \frac{1}{2}\left(\frac{z}{D}\right)^{\left(\frac{k-2}{4}\right)} e^{-\left(\frac{z+D}{2}\right)} I_{\frac{k}{2}-1}\left(\sqrt{zD}\right) \text{ for } z > 0,$$

and $p_\beta^{Live}(z \mid D) = 0$ otherwise, where $$I_{\frac{k}{2}-1}$$

is a modified Bessel function.

14. The article of claim 11, further comprising instructions to assign a likelihood ϵ that a virtual object is incorrectly identified as a live track,
wherein $$\varepsilon = 1 - \int_{-\infty}^{M} p_\beta^{Virtual}(z)dz$$

and where $p_\beta^{Virtual}$ is a probability density function of the tagging statistic for a virtual object and M is the tagging statistic threshold,
wherein $$p_\beta^{Virtual}(z) = \frac{1}{2^{\frac{k}{2}}\Gamma\left(\frac{k}{2}\right)} e^{-\left(\frac{z}{2}\right)} z^{\left(\frac{k}{2}-1\right)} \text{ for } z > 0,$$

and $p_\beta^{Virtual}(z) = 0$ otherwise.

15. An apparatus, comprising:
circuitry to:
tag a track as a live track if a tagging statistic is greater than a tagging statistic threshold; and
tag the track as a virtual track if the tagging statistic is less than the tagging statistic threshold.

16. The apparatus of claim 15 wherein the circuitry comprises at least one of a processor, a memory, programmable logic and logic gates.

17. The apparatus of claim 15 wherein the tagging statistic is given by:

$$\beta(X,P,X_V) = (X-X_V)^T P^{-1}(X-X_V),$$

where $X_V$ is a state vector of a virtual object at the time of the last track update, X is a state vector of the track and P is the covariance matrix for the state vector of the track.

18. The apparatus of claim 17, further comprising circuitry to assign a likelihood ρ that a live object is incorrectly identified as a virtual track,
wherein $$\rho = \int_{-\infty}^{M} p_\beta^{Live}(z \mid D)dz$$

and where $p_\beta^{Live}$ is a probability density function of the tagging statistic for a live object, M is the tagging statistic threshold and D represents a normalized distance between expected live and virtual objects.

19. The apparatus of claim 18 wherein D is represented by:

$$D(X_R, P, X_V) = (X_R - X_V)^T P^{-1}(X_R - X_V)$$

where $X_R$ is a true state vector on which the calculated track state vector, X, is based.

20. The apparatus of claim 18 wherein $$p_\beta^{Live}(z|D) = \frac{1}{2}\left(\frac{z}{D}\right)^{\left(\frac{k-2}{4}\right)} e^{-\left(\frac{z+D}{2}\right)} I_{\frac{k}{2}-1}\left(\sqrt{zD}\right) \text{ for } z > 0,$$

and $p_\beta^{Live}(z|D) = 0$ otherwise, where $$I_{\frac{k}{2}-1}$$

is a modified Bessel function.

* * * * *